United States Patent [19]

Tsugita et al.

[11] Patent Number: 5,049,657
[45] Date of Patent: Sep. 17, 1991

[54] PROCESS FOR HYDROLYSIS OF PEPTIDE OR PROTEIN

[75] Inventors: Akira Tsugita, Osaka, Japan; Hans W. Mewes, Schönau, Fed. Rep. of Germany; Tatsuaki Ataka, Tokyo, Japan

[73] Assignee: Seiko Instruments & Electronics Ltd., Japan

[21] Appl. No.: 813,043

[22] Filed: Dec. 24, 1985

[30] Foreign Application Priority Data

Dec. 25, 1984 [JP] Japan .................. 59-279312

[51] Int. Cl.$^5$ .............. C07K 3/10; C07K 1/12
[52] U.S. Cl. ..................... 530/343; 530/407
[58] Field of Search ................. 530/343, 407

[56] References Cited

U.S. PATENT DOCUMENTS

| | | | |
|---|---|---|---|
| 1,280,862 | 10/1918 | Satow | 530/407 X |
| 2,049,576 | 8/1936 | Ungnade | 530/407 X |
| 2,434,715 | 1/1948 | Olcott et al. | 530/407 X |
| 3,030,380 | 4/1962 | Weygand et al. | 530/407 X |
| 3,391,001 | 7/1968 | Sair | 530/407 X |
| 3,493,385 | 2/1970 | Hack | 530/407 X |
| 3,778,513 | 12/1973 | Shiga et al. | 530/407 X |
| 4,152,260 | 5/1979 | Mellqvist | 530/407 X |
| 4,436,727 | 3/1984 | Ribi | 530/407 X |
| 4,546,004 | 10/1985 | Rhee et al. | 530/377 X |

OTHER PUBLICATIONS

Proc. Japan Acad. 58, Ser. B (1982), 1-4, Tsugita et al.
Eur. J. Biochem. 124 (1982), 585-588, Tsugita et al.
Z. Physiol. Chem. 365 (1984), 343-345, Tsugita et al.

*Primary Examiner*—Howard E. Schain
*Attorney, Agent, or Firm*—Bruce L. Adams; Van C. Wilks

[57] ABSTRACT

Peptide or protein are immobilized on a solid surface and exposed to acid mixture for hydrolysis. The acid mixture comprises mainly hydrocloride and trifruoracetic acid. The temperature of it is in the range of 100° to 180° C. The time period of exposing is in the range of 5 to 120 min.

11 Claims, 3 Drawing Sheets

PROCESS FOR HYDROLYSIS OF PEPTIDE OR PROTEIN

BACKGROUND OF THE INVENTION

1. Field of the Invention

The present invention relates to a process for hydrolysis of protein which is conducted prior to amino acid hydrolysis. More particularly, the invention provides a new process for hydrolyzing protein adsorbed on a solid surface by a solid phase/gas phase reaction with a vaporized acid mixture.

2. Description of the Prior Art

The hydrolysis of protein which is a pretreatment to be conducted prior to amino acid analysis has been carried out with distilled, azeotropic hydrochloric acid at 100° to 110° C. in an air-free sealed tube for a time of as long as 24 to 144 hours. It is a major disadvantage of the conventional process to heat starting materials for such a long period. While, according to a method of Tsugita et al. developed recently, the hydrolysis can be carried out rapidly in 25 to 50 min with a mixed solution of hydrochloric acid (HCl), trifluoroacetic acid ($CF_3COOH$; hereinafter referred to as TFA) and water ($H_2O$) [see references (1) to (3)]. The gist of the process developed by Tsugita et al. is as follows:

(i) A high reaction temperature is employed so as to enhance the hydrolysis reaction rate. When the temperature is elevated by 10° C., the reaction rate is approximately doubled. When the temperature is elevated by 60° C., the reaction rate is increased by 64-fold ($=2^6$). Namely, the unit "hour" may be replaced roughly by "minute" in this case.

(ii) When an organic solvent, particularly a strongly acidic organic acid, is added to protein, a hydrophobic peptide moiety can be hydrolyzed easily.

The fact that the hydrolysis rate is increased by the temperature rise will now be described. A relationship between the hydrolysis rate of Val-Glu dipeptide which is considered to be difficultly hydrolyzable with an acid and the temperature is shown in FIG. 5. The hydrolysis time was 25 min. For comparison, the results obtained by using 6M-HCl are also shown. It is apparent from FIG. 5 that the reaction rate is increased as the temperature is elevated. The reaction rate obtained when a mixture of TFA and hydrochloric acid [$CF_3CO_2H$:HCl (1:2)] was used was far higher than that obtained when 6M-HCl was used.

The effects of the organic acids added to protein will be shown below. The results obtained by using volatile organic acids having relatively excellent effects are summarized in Table 1. It is apparent from this Table that the effect obtained by the addition of TFA is most excellent.

TABLE 1

| Recovery of amino acids from Val—Glu | | |
|---|---|---|
| formic acid:HCl | 1:1 | 85% |
| | 1:2 | 95% |
| acetic acid:HCl | 1:1 | 97% |
| | 1:2 | 100% |
| TFA:HCl | 2:1 | 85% |
| | 1:1 | 100% |
| | 1:2 | 100% |
| propionic acid:HCl | 1:1 | 90% |
| | 1:2 | 97% |

It will be understood from the above-described facts that the elevation of the hydrolysis temperature and the addition of TFA are most effective in accelerating the hydrolysis.

In an experiment, myoglobin, one of known proteins, was hydrolyzed with TFA/hydrochloric acid (1:2) for 10 and 25 minutes and the decomposition rate of the protein was determined from the recovery of alanine to obtain the results shown in FIG. 6. It is apparent that 100% recovery was obtained at around 166° C. after 25 minutes.

Though the hydrolysis process developed by Tsugita et al. wherein a mixed solution of TFA and water is used is capable of completing the hydrolysis rapidly within 20 to 50 minutes, it has a defect that the formed amino acids are contaminated with a solvent used in this solution process to cause an error in the analysis valued in terms the amino acids. Therefore, a complicated evaporation procedure is necessitated in this process for removing the acid after the hydrolysis to make the automatic operation thereof difficult. In addition, a long time is required prior to the analysis of the amino acids and, therefore, synchronization with the amino acid analysis device is difficult.

References (1) Akira Tsugita and Jean Jacques Scheffler; Proc. Japan Acad., 58, Ser. B (1982).

(2) Akira and Jean Jacques Scheffler; Eur. J. Biochem. 124 (1982) 585.

(3) Akira Tsugita, Francis Vilbors, Carl Jone and Rudorf van den Broek; Z. Physiol. Chem. 365 (1984) 343.

SUMMARY OF THE INVENTION

It is therefore an object of the present invention to provide a method for hydrolysis of peptide or protein which is possible to prevent the contamination of the amino acids formed by the decomposition.

It is another object to provide a method for hydrolysis of peptide or protein which hydrolyze the protein more rapidly.

It is a further object to provide a method for hydrolysis of peptide or protein which is suitable for automation.

These and other objects and advantages are achieved according to the present invention. The peptide or protein are immobilized on a solid surface such as glass. Immobilization is achieved by adsorption onto the surface of a support or by other linkage means. Hydrolysis of immobilized peptide or protein is conducted by exposing it to a reaction gas composed of mainly hydrochloric acid and trifluoroacetic acid, temperature of which is in the range of 100° to 180° C. The time period of exposing is in the range of 5 to 120 minutes.

Other objects, advantages and features of the present invention will become better understood by reference to the following detailed description when considered in conjunction with the accompanying drawings.

DETAILED DESCRIPTION OF THE PREFERRED EMBODIMENT

The following examples will further illustrate the present invention.

EXAMPLE 1

In this example, a fundamental embodiment of this process for the hydrolysis by the gas phase/solid phase hydrolytic reaction is illustrated.

Figure 1:
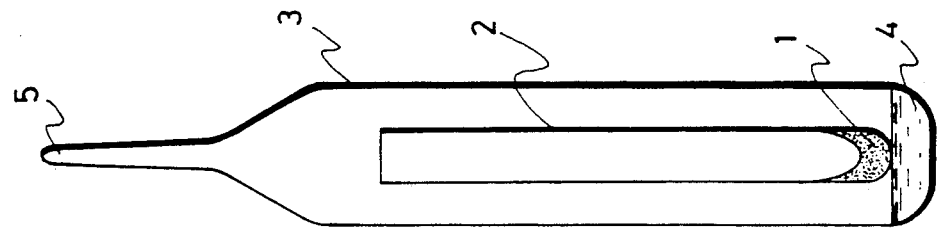
FIG. 1 is a sectional view of a vessel used in the experiment of the gas phase hydrolysis process in Example 1.

For simplification, 2.5 nmol of Val-Glu dipeptide 1 was placed in a small test tube 2 as shown in FIG. 1 and dried sufficiently. The test tube 2 was then placed in a large test tube 3 in which 500 μl of a liquid-phase acid mixture 4 of HCl:TFA (3:2) had been placed at the bottom. The solid phase of Val-Glu and the liquid phase of acid mixture are isolated from each other. The test tube 3 was sealed in vacuum under cooling with ice to form an ampoule 5. The sealed test tube was placed in an oil bath kept at 166° C. and heated for 30 minutes. By this treatment, the acid mixture 4 was vaporized in the form of a gas phase to contact with the solid phase of Val-Glu dipeptide to thereby substantially completely hydrolyze the dipeptide by the gas phase/solid phase reaction. After the heating conducted for 30 minutes, the test tube 2 was taken out and formed acids were removed thoroughly in a vacuum desiccator. 80 μl of 0.01 M-HCl was placed in the dry test tube 2 to dissolve the hydrolyzate. The solution was analyzed with an amino acid analyzer (product of Durrum) to reveal that the recovery of the amino acids constituting the dipeptide was 100%. The contamination with Gly and Ser which are considered to be contaminants was reduced to less than 10 pmol below the sensitivity of the analyzer. 100 to 300 pmol of the contaminants remain in an ordinary conventional process.

It is apparent from this example that the hydrolysis was effected by the gas phase/solid phase reaction.

EXAMPLE 2

This example is to demonstrate that the hydrolysis reaction rate is increased remarkably by elevating the temperature of the vaporized acid mixture of hydrochloric acid (HCl) and TFA.

Figure 2:
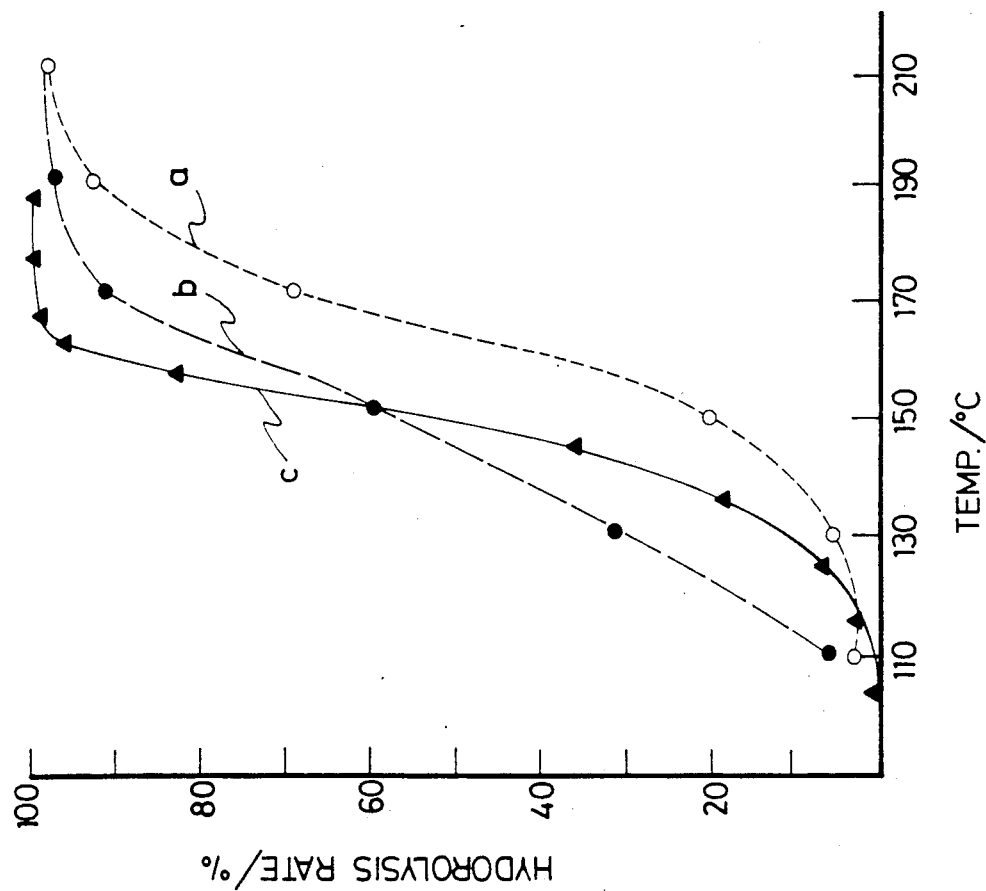
FIG. 2 shows curves showing relationships between the temperature and the hydrolysis rate of Val-Glu according to the present invention (curve c), liquid phase process (curve b) and conventional process (curve a)

The Val-Glu dipeptide was hydrolyzed in the same manner as in Example 1 except that the temperature was varied in the range of 110° to 210° C. and the hydrolysis rates were determined to obtain the results shown by a curve c in FIG. 2. For comparison, the results obtained by the ordinary hydrochloric acid process and the liquid phase process developed by Tsugita et al. are also shown in FIG. 2.

In FIG. 2, curves a to c show the results obtained under the following conditions:
a: ordinary hydrochloric acid process, 6M HCl, 25 min.,
b: liquid phase process of Tsugita et al., TFA:HCl=(1:2), 25 min.,
c: process of the present invention, TFA:HCl=(2:3), 25 min.

It is apparent from this example that as the temperature of the vaporized acid mixture was elevated, the reaction was accelerated remarkably. It is also apparent that the hydrolysis reaction was carried out most rapidly according to the process of the present invention.

EXAMPLE 3

This example is to demonstrate that the amino acid recovery obtained by the process of the present invention is quite sufficient The recoveries of various amino acids obtained by the hydrolysis effected by the same process as in Example 1 were determined to obtain the results shown in Table 2. For comparison, the results obtained by using the acid mixture solutions investigated by Tsugita et al are also shown. The values given in Table 2 refer to the recoveries obtained after heating the starting material at 166° C. in a gas phase (TFA HCl=2:3) and at 170° C. in a liquid phase (TFA:HCl=1:2). The recoveries of amino acids are given by percentage based on glutamic acid. It is apparent from the results shown in Table 2 that the hydrolysis process of the present invention with the vaporized acid mixture is satisfactory like the liquid phase process.

TABLE 2

| | Amino acid recoveries | | | |
|---|---|---|---|---|
| | Gas phase | | Liquid phase | |
| | 15 min | 30 min | 25 min | 50 min |
| Asp | 94 | 97 | 99 | 103 |
| Thr | 89 | 82 | 92 | 84 |
| Ser | 75 | 61 | 85 | 78 |
| Glu | 100 | 100 | 100 | 100 |
| Pro | 84 | 85 | 96 | 98 |
| Gly | 93 | 91 | 104 | 108 |
| Ala | 113 | 110 | 115 | 101 |
| Val | 102 | 102 | 98 | 98 |
| Met | 70 | 65 | 87 | 76 |
| Ile | 97 | 99 | 93 | 95 |
| Leu | 96 | 100 | 92 | 94 |
| Tyr | 92 | 94 | 89 | 81 |
| Phe | 99 | 101 | 90 | 87 |
| His | 106 | 101 | 96 | 99 |
| Lys | 101 | 101 | 95 | 98 |
| Arg | 108 | 106 | 100 | 100 |

EXAMPLE 4

In this example, various proteins were hydrolyzed with the vaporized acid mixture of the present invention. The experiment was conducted in the same manner as in Example 1 using the following proteins:
glucagon
cytochrome C
chymotrypsinogen A
myoglob An aqueous solution of about 5 μg of each protein sample was placed in the same small test tube as in Example 1 and dried sufficiently in vacuum. The hydrolysis was conducted in the same manner as in Example 1. The hydrolysis with the vaporized acid mixture was conducted at 161° C. for 22.5 minutes (22.5 V in Tables 3-11 to 3-3) and 45 minutes (45 V in Tables 3-1 to 3-3). The acid mixture was placed at the bottom of the test tube, the acid mixture being comprised of TFA and hydrochloric acid in a ratio of 2:3. The hydrolyzed sample was dissolved in 80 μl of 0.01M HCl and the amino acid composition was analyzed with an ordinary amino acid analyzer. The results are summarized in Tables 3-1 to 3-3. For comparison, the results obtained by the process developed by Tsugita et al. wherein the acid mixture was used and by a process wherein azeotropic hydrochloric acid (5.7M) was used are also shown in Tables 3-1 to 3-3. In the former process wherein the acid mixture was used, the hydrolysis was conducted with a mixture of TFA and hydrochloric acid in a ratio of 1:2 at 166° C. for 25 minutes (25 L in Tables 3-1 to 3-3) and 50 minutes (50 L in Tables 3-1 to 3-3). In the latter process wherein the azeotropic hydrochloric acid (5.7M) was used, the treatment was conducted at 106° C. for 24 hours (24C in Tables 3-1 to 3-3) and 72 hours (72C in Tables 3-1 to 3-3). In Tables 3-1 to 3-3, values "T" refer to values calculated from the primary structure of the protein. The values in the parentheses given in the columns of Thr and Ser are those extrapolated to time 0.

It is apparent from Tables 3-1 to 3-3 that the amino acid composition of the protein found by the experiment coincided well with the calculated one. This fact suggests that the process of the present invention for hydrolyzing protein with the vaporized acid mixture is quite effective.

TABLE 3

| | Glucagon | | | Cytochrome C | | |
|---|---|---|---|---|---|---|
| | 22.5 V | 45 V | T | 22.5 V | 50 V | T |
| Asp | 4.3 | 4.3 | 4 | 8.1 | 8.3 | 8 |
| Thr[1] | 2.7 | 2.6 (2.9) | 3 | 9.0 | 8.1 (9.9) | 10 |
| Ser[1] | 3.3 | 2.7 (3.8) | 4 | 0 | 0 | 10 |
| Glu | 3.0 | 3.0 | 3 | 11.9 | 12.0 | 12 |
| Pro | 0 | 0 | 0 | 3.8 | 3.8 | 4 |
| Gly | 1.1 | 1.0 | 1 | 11.8 | 12.0 | 12 |
| Ala | 1.1 | 1.1 | 1 | 6.0 | 6.0 | 6 |
| Val | 1.0 | 1.0 | 1 | 2.6 | 3.0 | 3 |
| Met | 0.8 | 0.6 | 1 | 1.9 | 1.8 | 2 |
| Ile[2] | 0 | 0 | 0 | 4.7 | 5.5 | 6 |
| Leu | 2.0 | 2.0 | 2 | 5.4 | 5.6 | 6 |
| Tyr[2] | 1.9 | 1.9 | 2 | 3.4 | 2.6 | 4 |
| Phe | 1.8 | 1.9 | 2 | 3.6 | 3.5 | 4 |
| His | 0.9 | 0.9 | 1 | 3.1 | 3.0 | 3 |
| Lys | 1.0 | 1.0 | 1 | 18.8 | 18.9 | 19 |
| Arg | 2.1 | 2.1 | 2 | 2.1 | 2.1 | 2 |
| Cys | 0 | 0 | 0 | 1.1 | 0.8 | 2 |

TABLE 3

| | Chymotrypsinogen A | | | | |
|---|---|---|---|---|---|
| | 22.5 V | 45 V | T | 25 L | 50 L |
| Asp | 23.2 | 23.4 | 23 | 22.7 | 23.0 |
| Thr[1] | 19.0 | 16.3 (21.7) | 23 | 19.8 | 17.0 (22.6) |
| Ser[1] | 21.7 | 16.3 (26.1) | 28 | 22.2 | 17.1 (27.7) |
| Glu | 14.9 | 14.8 | 15 | 15.0 | 15.2 |
| Pro | 8.6 | 8.8 | 9 | 9.1 | 9.0 |
| Gly | 23.0 | 23.0 | 23 | 23.2 | 23.4 |
| Ala | 22.0 | 22.0 | 22 | 22.0 | 22.0 |
| Val | 20.0 | 21.7 | 23 | 18.2 | 22.3 |
| Met | 2.1 | 2.1 | 2 | 1.0 | 1.3 |
| Ile[2] | 7.7 | 9.1 | 10 | 6.9 | 9.5 |
| Leu | 18.1 | 18.4 | 19 | 16.4 | 19.1 |
| Tyr[2] | 3.3 | 2.5 | 4 | 3.1 | 3.8 |
| Phe | 5.4 | 5.3 | 6 | 5.3 | 5.6 |
| His | 1.9 | 1.9 | 2 | 2.3 | 1.5 |
| Lys | 13.5 | 13.9 | 14 | 13.8 | 13.8 |
| Arg | 4.0 | 4.0 | 4 | 4.2 | 4.2 |
| Cys | 5.3 | 5.7 | 10 | 4.0 | 2.4 |

TABLE 3

| | Myoglobin | | | | | |
|---|---|---|---|---|---|---|
| | 22.5 V | 45 V | T | 25 L | 50 L | 24 C | 72 C |
| Asp | 8.2 | 8.3 | 8 | 8.0 | 8.2 | 8.4 | 8.1 |
| Thr[1] | 4.8 | 4.5 (5.1) | 5 | 4.8 | 4.6 (5.0) | 4.9 | 4.8 (5.1) |
| Ser[1] | 5.4 | 4.8 (6.0) | 6 | 5.6 | 5.3 (6.0) | 5.8 | 5.7 (6.0) |
| Glu | 19.0 | 19.0 | 19 | 18.9 | 19.0 | 19.5 | 18.9 |
| Pro | 4.2 | 4.2 | 4 | 4.1 | 4.0 | 3.9 | 3.9 |
| Gly | 11.0 | 11.1 | 11 | 11.0 | 11.2 | 11.6 | 11.0 |
| Ala | 17.2 | 17.1 | 17 | 17.0 | 17.0 | 17.0 | 17.0 |
| Val | 7.6 | 7.9 | 8 | 7.0 | 7.7 | 4.8 | 7.3 |
| Met | 1.7 | 1.9 | 2 | 1.8 | 1.7 | 1.8 | 1.9 |
| Ile[2] | 6.8 | 8.4 | 9 | 7.7 | 8.7 | 5.3 | 7.7 |
| Leu | 16.3 | 17.4 | 18 | 17.7 | 18.3 | 15.3 | 16.3 |
| Tyr[2] | 2.0 | 0.5 | 2 | 2.0 | 2.0 | 2.0 | 2.0 |
| Phe | 5.6 | 5.9 | 6 | 5.6 | 6.0 | 4.6 | 4.9 |
| His | 11.9 | 11.9 | 12 | 11.9 | 12.0 | 10.7 | 11.8 |
| Lys | 18.5 | 18.8 | 19 | 19.1 | 19.3 | 17.1 | 19.0 |
| Arg | 4.0 | 4.0 | 4 | 4.1 | 4.0 | 3.5 | 4.1 |
| Cys | 5.6 | 5.4 | 10 | 4.1 | 2.6 | 3.6 | 2.6 |

EXAMPLE 5

Figure 3:
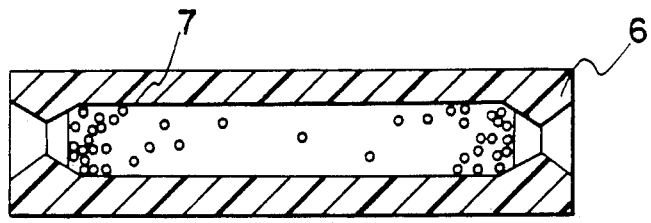
FIG. 3 is a sectional view of a sample holder for a hydrolysis device which can be synchronized with the amino acid analyzer used in Example 5.
Figure 4:
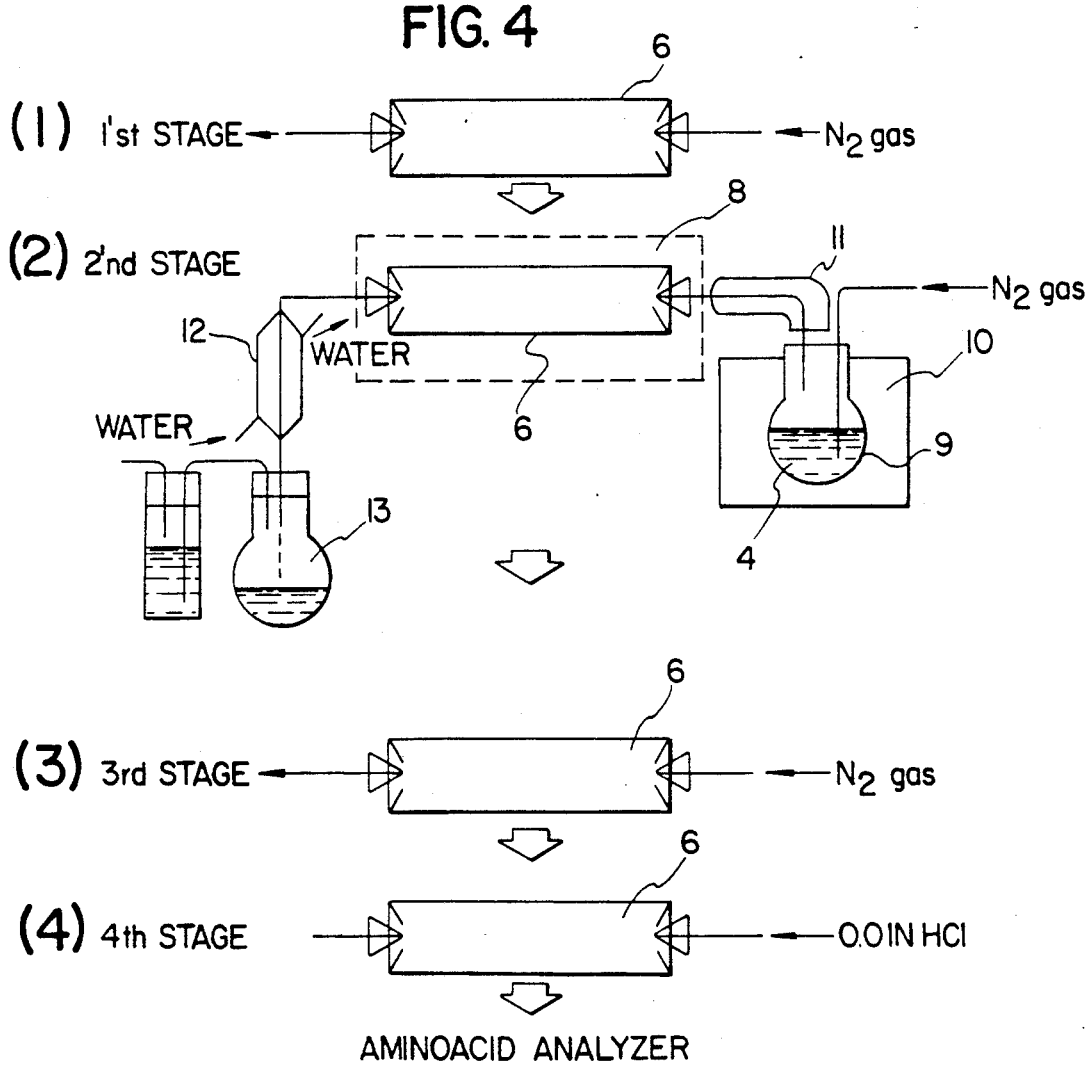
FIG. 4 is a rough sketch of the respective stages in the gas phase/solid phase hydrolysis device used in Example 5.
Figure 6:
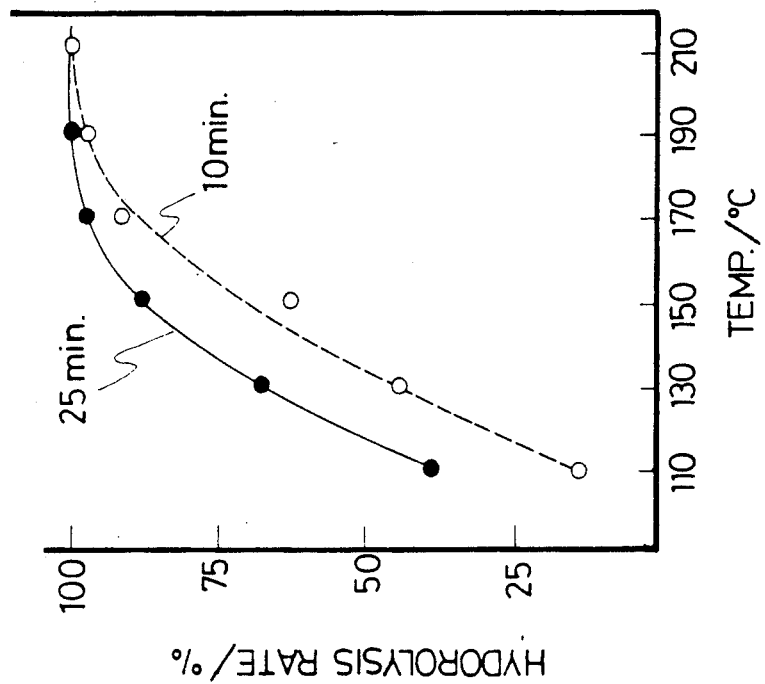
FIG. 6 shows curves of hydrolysis of myoglobin with TFA:HCl (1:2).
Figure 5:
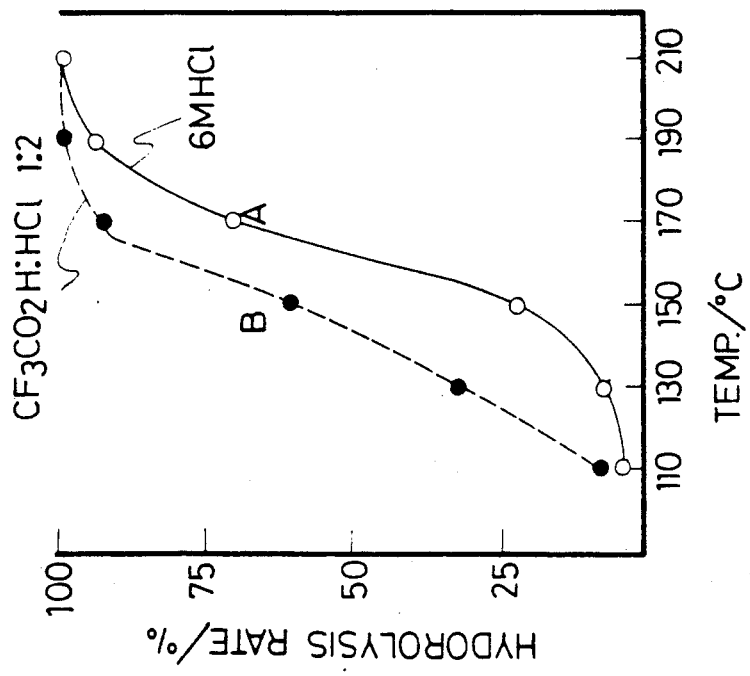
FIG. 5 shows curves showing relationships between the temperature and hydrolysis rate of Val-Glu according to the liquid phase process and the conventional process.

This example provides an embodiment of a hydrolysis device according to the gas phase/solid phase reaction which can be connected to an automatic amino acid analyzer to conduct synchronized operation. As shown in FIG. 4, the hydrolysis device shown in FIG. 3 is transported through undergoes four-stage operation. A sample holder 6 shown in FIG. 3 is transported through the respective steps according to a cascade system. $N_2$ gas, acid mixture vapor and 0.01M HCl are introduced into the sample holder 6 through respective valves. The sample in the sample holder 6 shown in FIG. 3 is prepared previously by adsorbing a protein in the form of its solution on glass or heat resistant resin beads or porous products 7 in the sample holder to form a substantial monomolecular thin film and drying the same. The capacity of the sample holder 6 is 100 μl. The sample holder 6 is placed automatically in the gas phase/solid phase hydrolysis device and transported automatically from stage (1) to stage (4) successively as shown in FIG. 4. The sample holder 6 into which $N_2$ gas has been introduced in the first stage (1) is transported to the second stage (2) and heated to 160° C. by means of a heater 8. A gaseous mixture of TFA, hydrochloric acid and water from a vessel 9 heated with a heater 10 is charged by $N_2$ gas into the sample holder 6 through a pipe heated with a heater 11. The heated gaseous mixture hydrolyzes the protein adsorbed on the beads or porous products 7 in the sample by the gas phase/solid phase reaction to substantially complete the hydrolytic decomposition of the protein due to a hydrolytic reaction between the solid phase and the gas phase to thereby produce constituent amino acids. Superfluous mixture vapor is liquefied in a condenser 12 and collected in a vessel 13. After completion of the hydrolysis carried out for 25 to 50 minutes, the sample holder 6 is transported to the third stage (3) and is cooled by introducing $N_2$ gas. The sample holder 6 is transported to the fourth stage (4). 0.01M HCl is introduced therein in an amount of 98 μl slightly smaller than the space (100 μl) in the sample holder. The sample holder 6 is sent to the subsequent amino acid analyzer.

The procedure shown in this example is essentially the same as that shown in Example 1. It is most important, however, in this example that this example proves the following facts: the hydrolysis by the gas phase/ solid phase reaction according to the present invention can be automated easily and also it can be synchronized with the subsequent operation of the amino acid analyzer.

The present invention has been described above with reference to the five examples. The effects of the present invention may be summarized as follows:

(1) No contamination is substantially caused. Since the process is carried out in a gas phase, the amino acids are essentially scarcely contaminated by the solvent unlike the solution process.

(2) The protein can be hydrolyzed rapidly. The hydrolysis time per se is short. Only a short time is required in each procedure because of the gas phase process. For example, the acid removal by complicated evaporation procedures is unnecessary and, therefore, the hydrolysis can be synchronized with the operation of the amino acid analyzer.

(3) The automation is easy. An error caused by the operator is avoidable and a high reproducibility can be realized in experiments carried out under given conditions. Since a series of the operation is conducted in one and the same device, a contamination due to a transfer into another vessel can be avoided.

Thus, the process of the present invention for the hydrolysis of protein with the mixture vapor has advantages which cannot be obtained by the conventional processes. The industrial value of this process is quite high.

What is claimed is:

1. A process for hydrolysis of peptide or protein comprising the steps of:
   immobilizing peptide or protein in a solid phase in the form of a thin film on a solid surface; and exposing said immobilized peptide or protein to a gas phase of acid mixture to hydrolyze the immobilized peptide or protein by reaction between the solid phase and the gas phase.

2. A process according to claim 1; wherein said peptide or protein is absorbed on said surface to form the thin film.

3. A process according to claim 1; wherein said solid surface is composed of a glass or heat resistant resin.

4. A process according to claim 2; wherein said solid surface comprises beads or porous products.

5. A process according to claim 1; wherein said acid mixture comprises a concentrated hydrochloric acid, trifluoroacetic acid and water.

6. A process according to claim 2; wherein said acid mixture contains phenol and a volatile reducing agent.

7. A process according to claim 1; wherein said acid mixture comprises at least 5.7 to 10M hydrochloric acid and 5 to 50% trifluoroacetic acid.

8. A process according to claim 1; wherein the temperature of said acid mixture is held at least in the range of 100° to 180° C.

9. A process according to claim 1; wherein the time of exposing said immobilized peptide or protein to said gas phase of the acid mixture is in the range of 5 to 120 minutes.

10. A process according to claim 4; wherein said acid mixture comprises at least 5.7 to 10M hydrochloric acid and 5 to 50% trifluoroacetic acid.

11. A process according to claim 4; wherein the temperature of said acid mixture is held at least in the range of 100° to 180° C.

* * * * *